Aug. 31, 1937.   C. W. DAKE   2,091,808
GAS TURBINE
Filed Nov. 2, 1931   4 Sheets-Sheet 2
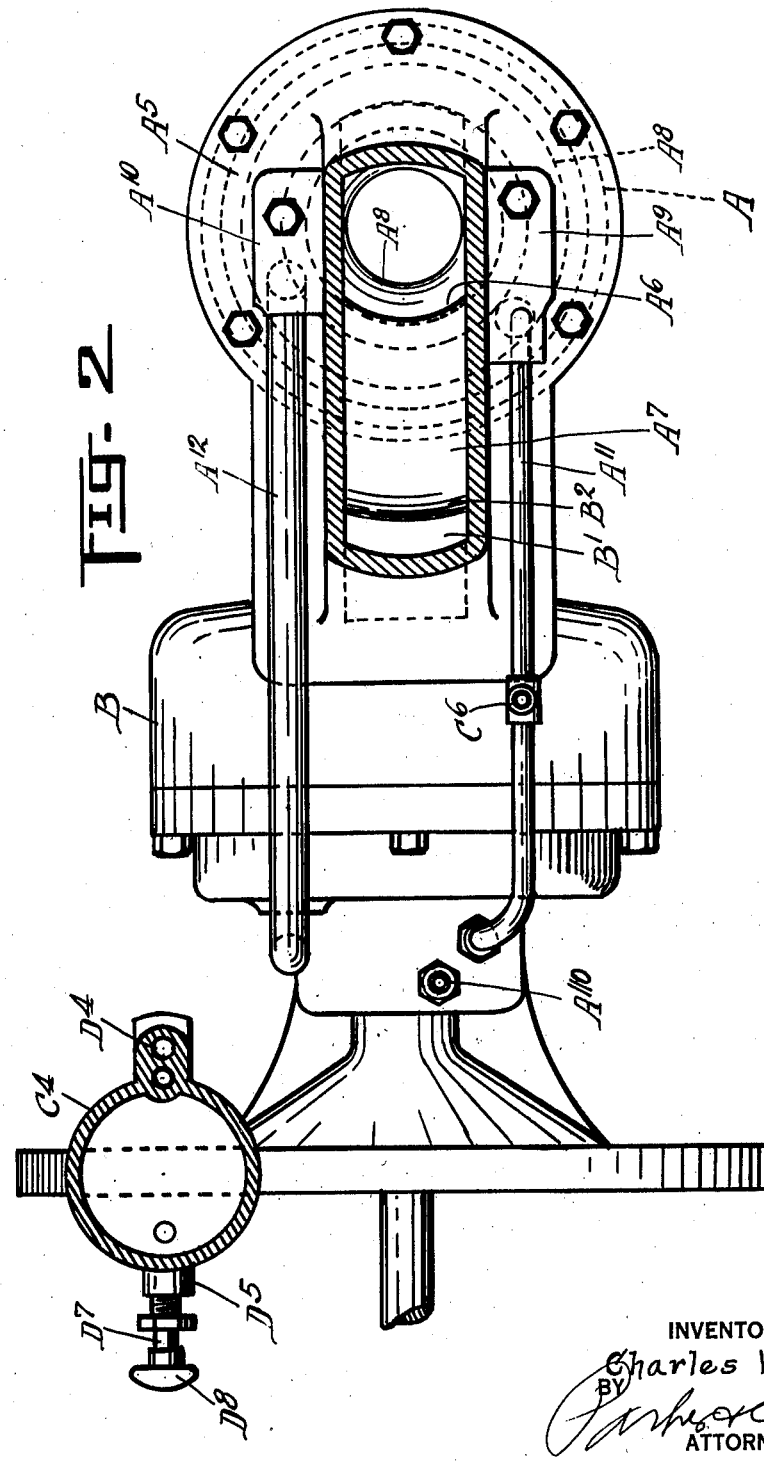
INVENTOR
Charles W. Dake
BY
ATTORNEY Aug. 31, 1937.  C. W. DAKE  2,091,808
GAS TURBINE
Filed Nov. 2, 1931  4 Sheets-Sheet 3
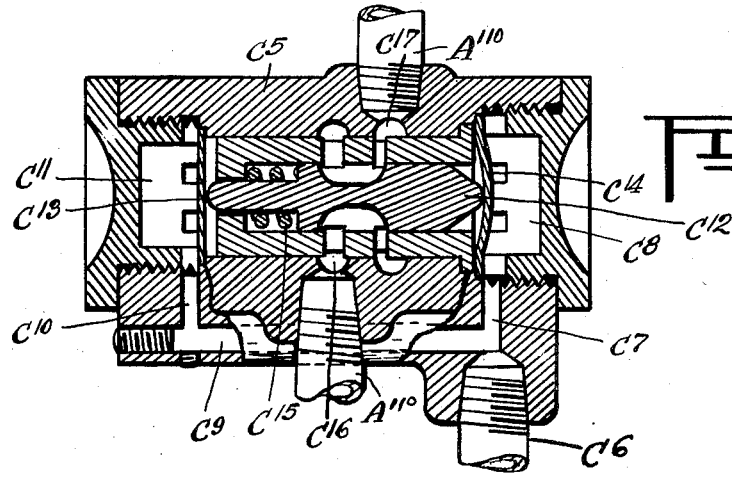
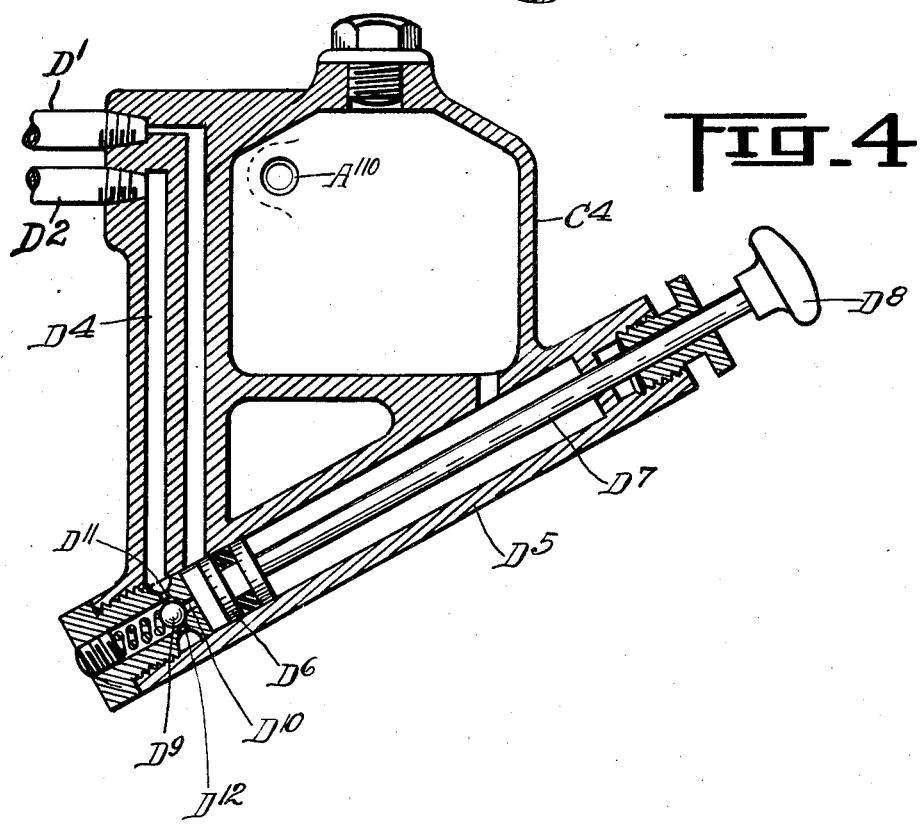
INVENTOR
Charles W. Dake
BY
ATTORNEY Aug. 31, 1937.    C. W. DAKE    2,091,808
GAS TURBINE
Filed Nov. 2, 1931    4 Sheets-Sheet 4

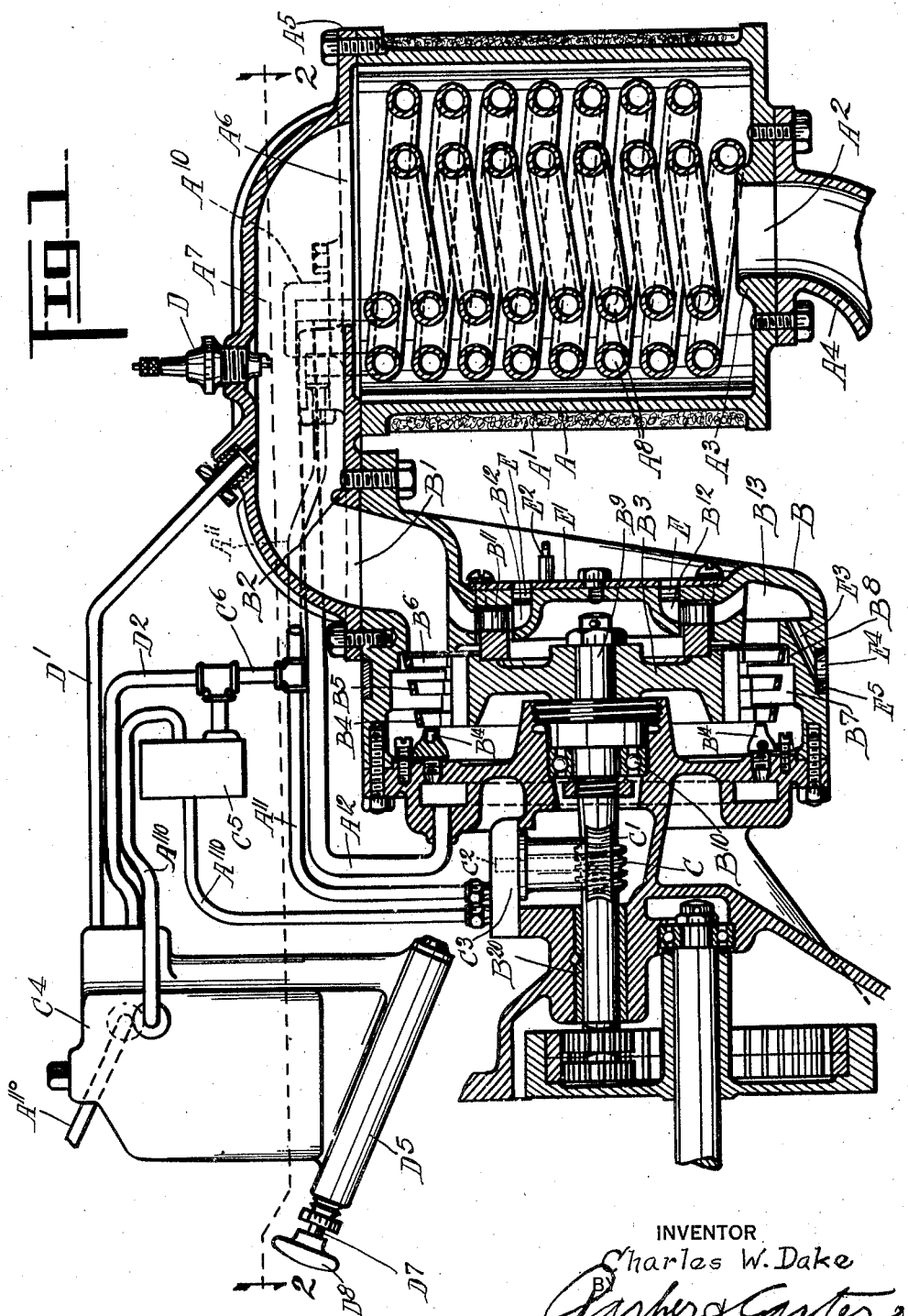

Inventor
Charles W. Dake
by Parker a Carter
Attorneys.

Patented Aug. 31, 1937

2,091,808

UNITED STATES PATENT OFFICE 2,091,808

GAS TURBINE

Charles W. Dake, Grand Haven, Mich.

Application November 2, 1931, Serial No. 572,719

8 Claims. (Cl. 60—36)

My invention relates to gas turbines and method of power generation and has for one object to provide a new and improved form of gas turbine wherein the turbine blades and guide passages will not be exposed to the direct heat of combustion. Another object of my invention is to provide a gas turbine wherein the elastic fluid which impinges upon the turbine bucket to generate power is subsequently burned to develop the necessary heat to vaporize and gasify the liquid fuel, and to generate sufficient pressure to provide the driving force for the turbine. Another object of my invention is to provide a method of power generation wherein a liquid fuel is vaporized under pressure, the vaporized liquid fuel is caused to generate power in a turbine and thereafter after its pressure has dropped is burnt to vaporize the liquid fuel to continue the cycle. Other objects of my invention will appear from time to time throughout the specification and claims.

My invention is illustrated more or less diagrammatically in the accompanying drawings, wherein—

Figure 1 is a vertical section through the turbine and generator;

Figure 2 is a horizontal section along the line 2—2 of Figure 1;

Figure 3 is a detail section through the pressure control valve;

Figure 4 is a detail section through the starting tank and starting pump.

Like parts are indicated by like characters throughout the specification and drawings.

Figure 5:
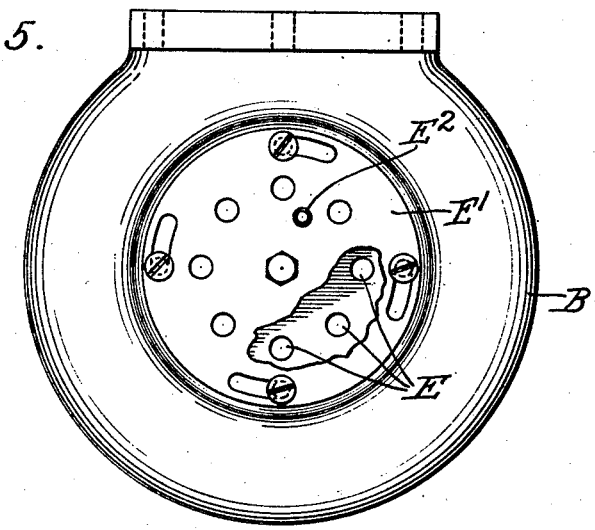
Figure 5 is a front view of the turbine housing shown in Figure 1.
Figure 7:
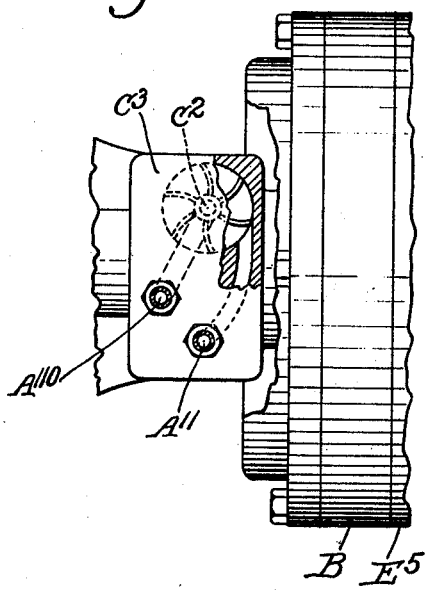
Figure 7 is a top plan view of the turbine rotor housing showing the centrifugal pump in part section.
Figure 6:
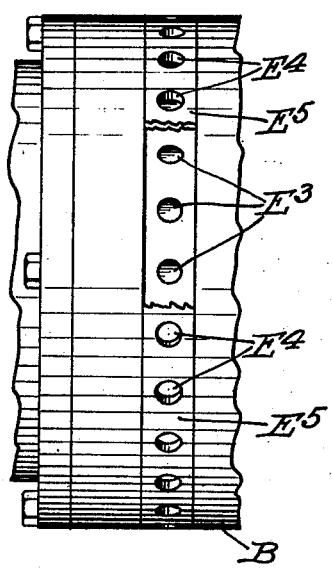
Figure 6 is a bottom plan view of the turbine rotor housing.

A is a cylindrical housing jacketed at $A^1$, any suitable jacketing being sufficient. As illustrated, it is jacketed with mineral wool. The housing is provided at the bottom with a central exhaust aperture $A^2$ surrounded by an upwardly extended flange $A^3$. In register with the aperture is an exhaust stack or pipe $A^4$. The upper end of the housing is closed by a plate $A^5$ centrally apertured at $A^6$. This plate forms the bottom wall of a combustion chamber $A^7$. $A^8$ is a double flash generator coil contained within the cylindrical housing, the coil being continuous from end to end. $A^9$ is a socket on the plate $A^5$ which contains one end of the coil, the outer portion of the coil is wound spirally about itself adjacent the wall of the housing and extends down to the bottom thereof. The inner coil is in continuation of the outer and is wound spirally back up inside to terminate at its end in the socket $A^{10}$. $A^{11}$ is a liquid fuel pipe extending in through the combustion chamber and communicating with the socket $A^9$. $A^{12}$ is a gas or motive fluid pipe extending from the socket $A^{10}$ outwardly through the housing, thus fuel may be as will hereinafter appear pumped in through the pipe $A^{11}$, socket $A^9$, outer portion of the coil down to the bottom of the cylindrical housing or chamber up through the inner portion of the coil to the socket $A^{10}$. During this excursion it will as will hereinafter appear be vaporized and be discharged through the pipe $A^{12}$ as vapor or motive fluid under pressure.

B is a turbine housing supported by the plate $A^5$ and thus in communication with the combustion chamber $A^7$, being in register with the aperture $B^1$, which aperture is surrounded by the raised wall $B^2$. $B^3$ is a turbine wheel mounted for rotation in the turbine housing having in this case three rows of buckets $B^4$ $B^5$ $B^6$ in working relation with two rows of guide passages $B^7$ $B^8$ projecting inwardly from the inner of the turbine housing. The turbine wheel is mounted on the turbine shaft $B^9$ supported by bearings $B^{10}$ $B^{20}$ in the usual manner. $B^{11}$ is a centrifugal air pump or fan mounted on the turbine wheel adapted to draw air in through the annular passage $B^{12}$ and discharge it into the exhaust ring $B^{13}$, which exhaust ring communicates with the port $B^1$ to the combustion chamber. $B^{14}$ are a plurality of gas nozzles adapted to direct the motive fluid against the turbine buckets. These gas nozzles are supplied with motive fluid by the pipe $A^{12}$.

C is a worm wheel on the turbine shaft in mesh with a worm gear $C^1$ which drives the pump shaft $C^2$. The centrifugal pump $C^3$ draws fuel from a suitable source of supply not indicated and feeds it under pressure to the generator coils through the pipe $A^{11}$ so that when the turbine rotates, the pump continuously supplies fuel to the generator. $C^4$ is a priming tank interposed in the pipe $A^{11}$ so that the pump in its operation keeping the system full of liquid fuel always keeps the priming tank filled. $C^5$ is a pressure control or governor valve interposed in the liquid fuel pipe $A^{11}$. $C^6$ is a bleeder pipe leading from the fuel pipe $A^{11}$ near the generator to the interior of the cylindrical governor housing, communicating by means of a radial passage $C^7$ with the chamber $C^8$ in one end of the governor housing and by means of a longitudinal passage $C^9$ and radial passage $C^{10}$ with the chamber $C^{11}$ at the other end of the governor housing. $C^{12}$ is a piston valve mounted for reciprocation in the housing. The ends of this valve engage flexible diaphragms $C^{13}$ $C^{14}$, the diaphragm $C^{14}$ being of larger area than $C^{13}$. The spring $C^{15}$ tends to push the valve to the right so that under normal working conditions the smaller diaphragm being assisted by the spring centers the valve so that fuel passes in at $C^{16}$ goes through the valve and out at $C^{17}$. If the pressure increases beyond the safe point the overbalance is no longer overcome by the spring and the valve moves to the right to reduce or if necessary altogether shut off the flow of fuel to the generator. This can take place because the pump is not a positive displacement pump.

D is a spark plug in the combustion chamber. $D^1$ is a fuel priming pipe discharging into the combustion chamber. $D^2$ is a priming pipe communicating with the bleeder pipe $C^6$. The pipes $D^1$ and $D^2$ communicate with a riser $D^4$ associated with the priming tank $C^4$. $D^5$ is a pump cylinder associated with the tank having a pump cup plunger $D^6$ adapted to be reciprocated in the cylinder $D^5$ by means of a pump rod $D^7$ and manually controlled handle $D^8$. $D^9$ is a ball check valve at the lower end of the cylinder $D^5$ controlling the opening $D^{10}$ so that when the piston is drawn out by hand the cylinder is filled with liquid fuel and when the piston is pushed back, the liquid passes out lifting the check valve $D^9$ filling the riser $D^4$, the pipes $D^1$ and $D^2$ whereby the liquid may be pumped into the generator coils and into the combustion chamber. $D^{11}$ $D^{12}$ are orifices whereby the relative proportion of liquid forced into the generator coils and combustion chamber is controlled in accordance with their relative sizes.

In order to control the relative amounts of air and combustible gas, the flow of air into the annular passage $B^{12}$ takes place through a plurality of ports E controlled by the aperture shutter $E^1$, $E^2$ being a handle whereby any suitable operating connection may be applied to control the position of the shutter. It may also sometimes happen especially when the turbine is at rest in starting that not enough air will flow in through the stationary fan or bucket blades so I provide also a series of air bleeder passages $E^3$ discharging into the exhaust ring terminating in a valve consisting of a series of ports $E^4$ controlled by an annular shutter $E^5$ which may be set once and for all. The shutter controlling the flow of air inwardly through the fan is adjustable during operation if and when that is needed. The shutter controlling the air makeup pipes, that is the valve $E^4$, $E^5$, is only open when the machine is started up and before the turbine commences to run. Under these circumstances the relatively low rate of gas movement through the system prevails and it is necessary to increase the supply of air. When the engine starts the operator will close this valve.

It will be evident that while I have shown in my drawings an operative device, still many changes might be made in the size, shape, arrangment, number and disposition of parts without departing materially from the spirit of my invention and I wish therefore that my showing be taken as in a sense diagrammatic.

The use and operation of my invention are as follows:

In starting the turbine cold the operator manipulates the hand pump a number of times, pumping a sufficient quantity of liquid fuel into the generator coils and into the combustion chamber. This fuel drops onto the plate $A^5$, flows down through the central orifice $A^6$ into and along the generator coils and after coating the coils forms a pool in the bottom of the cylindrical housing. The liquid is kept from escaping through the orifice $A^2$ by the wall $A^3$ and kept from flowing back into the turbine by the wall $B^2$. Before the fuel is injected the spark plug will be energized. There will be a certain amount of air in the system and as the spray of fuel flows into the combustion chamber, it will be ignited by the spark plug before a sufficient concentration to cause explosive action can take place. This fuel will commence to burn and will continue to burn as long as the operator continues to pump it in, receiving sufficient additional air to support combustion through the turbine housing. As soon as the generator coils are heated sufficiently the liquid fuel therein will be vaporized and pressure will be generated. This pressure will cause the vaporized liquid fuel to flow out through the turbine nozzles to drive the turbine because since the pressure builds up in the system the gas must have some place to escape and cannot escape against the pressure of the liquid fuel forced in by the pump and so must escape from the other end of the coil. As soon as this turbine commences rotation, the operator ceases pumping if he has not already done so and from then on the rotation of the turbine wheel supplies sufficient fuel to the generator to maintain pressure and cause continued operation of the turbine wheel. The spent gas discharged from the turbine wheel into the exhaust is by the air pump mixed with a sufficient amount of air to support combustion in the combustion chamber, the burning and burnt products of combustion passing down through the generator housing to keep it hot and continue the vaporizing process and the generation of further vapor under pressure to operate the turbine.

Under ordinary circumstances the governor mechanism here shown is adequate and sufficient because the amount of liquid fuel pumped into the generator coil during any given short time interval is exceedingly minute. Vaporization of the fuel will take place very soon after, if not immediately after the fuel has entered the generator and since the generator is a true flash generator only a very small amount of liquid fuel will ever be in the generator at one time. The pump is pumping against generator pressure, pumping in only a very small amount of liquid. As soon as the pressure reaches the point at which the governor valve operates the supply of fuel pumped in will be reduced or altogether stopped and owing to the very small amount of liquid fuel in the generator at any one time this will give an almost instant response to the governor action and so by controlling the pressure in the generator itself will directly control the operation of the turbine.

I claim:

1. In combination, an elastic fluid turbine having a turbine wheel, an annular exhaust chamber and a plurality of motive fluid nozzles, a generator housing, a combustion chamber between them, a generator coil in the housing, a communication between one end thereof and the motive fluid nozzles and means including a pump driven by the turbine for supplying motive fluid to the other end of the coil, a centrifugal air pump carried by the turbine wheel and adapted to discharge air to support combustion into the exhaust chamber about the periphery thereof, there being a free and unobstructed passage for the entire supply of mixed air and motive fluid through the exhaust chamber to and through the combustion chamber and the generator housing.

2. In combination, an elastic fluid turbine having a turbine wheel, an annular exhaust chamber and a plurality of motive fluid nozzles, a generator housing, a combustion chamber between them, a generator coil in the housing, a communication between one end thereof and the motive fluid nozzles and means including a pump driven by the turbine for supplying motive fluid to the other end of the coil, a centrifugal air pump carried by the turbine wheel and adapted to discharge air to support combustion into the exhaust chamber about the periphery thereof, there being a free and unobstructed passage for the entire supply of mixed air and motive fluid through the exhaust chamber to and through the combustion chamber and the generator housing, manually controlled means for adjusting the amount of air supplied to the exhaust chamber.

3. In combination, an elastic fluid turbine having a horizontal shaft, a turbine wheel thereon, an annular exhaust chamber and motive fluid nozzles associated with the wheel, a horizontal combustion chamber communicating with the uppermost part of the exhaust chamber, a generator housing extending downwardly from the opposed end of the combustion chamber, a generator coil therein, a pump driven by the turbine shaft and adapted to supply motive fluid to one end of the coil and a communication between the opposed end of the coil and the motive fluid nozzles, an air pump carried by the turbine wheel and adapted to discharge air centrifugally into the exhaust chamber about the periphery thereof.

4. In combination, an elastic fluid turbine having a horizontal shaft, a turbine wheel thereon, an annular exhaust chamber and motive fluid nozzles associated with the wheel, a horizontal combustion chamber communicating with the uppermost part of the exhaust chamber, a generator housing extending downwardly from the opposed end of the combustion chamber, a generator coil therein, a pump driven by the turbine shaft and adapted to supply motive fluid to one end of the coil and a communication between the opposed end of the coil and the motive fluid nozzles, an air pump carried by the turbine wheel and adapted to discharge air centrifugally into the exhaust chamber about the periphery thereof, separate air supply means for the exhaust chamber independent of the turbine wheel and manually adjustable control means for both said air supply means.

5. In combination, an elastic fluid turbine having a horizontal shaft, a turbine wheel thereon, an annular exhaust chamber and motive fluid nozzles associated with the wheel, a horizontal combustion chamber communicating with the uppermost part of the exhaust chamber, a generator housing extending downwardly from the opposed end of the combustion chamber, a generator coil therein, a pump driven by the turbine shaft and adapted to supply motive fluid to one end of the coil and a communication between the opposed end of the coil and the motive fluid nozzles, an air pump carried by the turbine wheel and adapted to discharge air centrifugally into the exhaust chamber about the periphery thereof, separate air supply means for the exhaust chamber independent of the turbine wheel and manually adjustable control means for both said air supply means, a combustion plate on the underside of the combustion chamber between the exhaust annulus and the generator housing, means for manually discharging, starting combustible fluid onto said plate and electric means in the combustion chamber for igniting the same.

6. A power generator comprising a housing, a vaporizer coil enclosed therein, a combustion chamber communicating with the housing, a gas turbine having its exhaust side communicating with the combustion chamber, a centrifugal air blower mounted on the turbine wheel adapted to discharge air into the combustion chamber with the spent motive gas from the turbine, nozzles adapted to supply motive fluid to the turbine, a communication between said nozzles and the vaporizer coil at one end and means for supplying liquid to the other end of the coil, said means including a pump operated by the turbine shaft, electric ignition means associated with the combustion chamber and manual priming means adapted to supply combustible fluid to the combustion chamber independent of the turbine.

7. In combination, an elastic fluid turbine, a plurality of nozzles adapted to supply motive fluid thereto, an annular exhaust passage adapted to receive the exhaust motive fluid from the turbine wheel, a rotary blower mounted on the turbine wheel and adapted to draw air from the atmosphere and discharge it into the annular exhaust passage, a combustion chamber in continuation of the annular exhaust passage, the turbine axis being generally horizontal, a horizontal combustion chamber communicating with and in continuation of the exhaust annulus at its uppermost point, a generator housing depending downwardly from the combustion chamber at a point removed from the communication therebetween and the exhaust annulus, an exhaust passage leading from the generating chamber, generator coils contained within the chamber, one end of the coil in direct communication with the nozzles and means comprising a pump driven by the turbine shaft for supplying combustible vaporizable liquid to the opposed end of the coil.

8. In combination, an elastic fluid turbine, a plurality of nozzles adapted to supply motive fluid thereto, an annular exhaust passage adapted to receive the exhaust motive fluid from the turbine wheel, a rotary blower mounted on the turbine wheel and adapted to draw air from the atmosphere and discharge it into the annular exhaust passage, a combustion chamber in continuation of the annular exhaust passage, the turbine axis being generally horizontal, a horizontal combustion chamber communicating with and in continuation of the exhaust annulus at its uppermost point, a generator housing depending downwardly from the combustion chamber at a point removed from the communication therebetween and the exhaust annulus, an exhaust passage leading from the generating chamber, generator coils contained within the chamber, one end of the coil in direct communication with the nozzles and means comprising a pump driven by the turbine shaft for supplying combustible vaporizable liquid to the opposed end of the coil, and means independent of the turbine for supplying additional air to the exhaust annulus.

CHARLES W. DAKE.